Nov. 13, 1923.
R. O. HERFORD ET AL
1,473,855
METHOD OF AND APPARATUS FOR MAKING BUSHES AND ROLLERS FOR GEAR CHAINS
Filed March 31, 1922   12 Sheets-Sheet 1
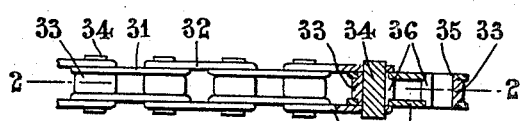
Fig.1.
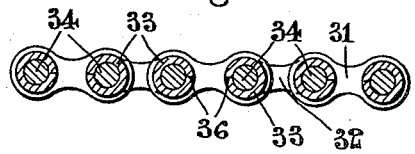
Fig.2.
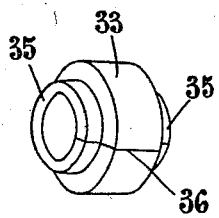
Fig.3.
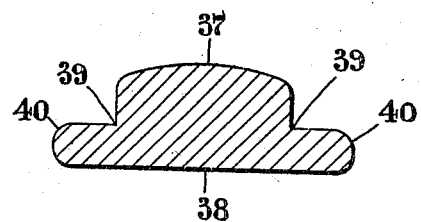
Fig.4.
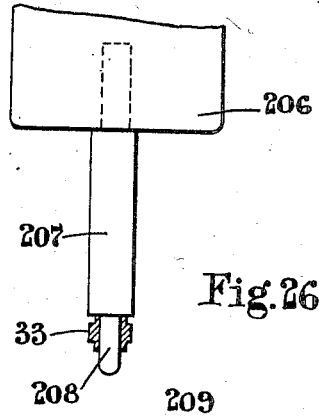
Fig.26.
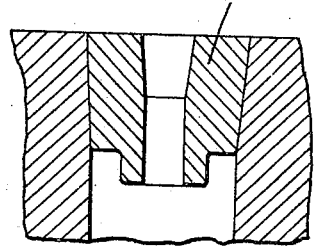
Inventors:
Robert O. Herford
Alfred Renshaw
by their attorney
James Hamilton Nov. 13, 1923.  
R. O. HERFORD ET AL  
1,473,855  
METHOD OF AND APPARATUS FOR MAKING BUSHES AND ROLLERS FOR GEAR CHAINS  
Filed March 31, 1922  12 Sheets-Sheet 3
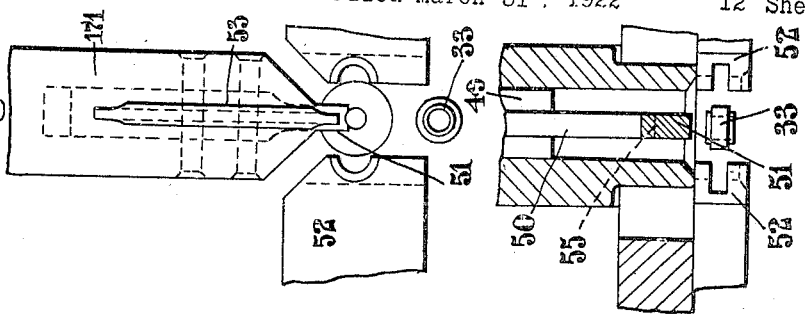
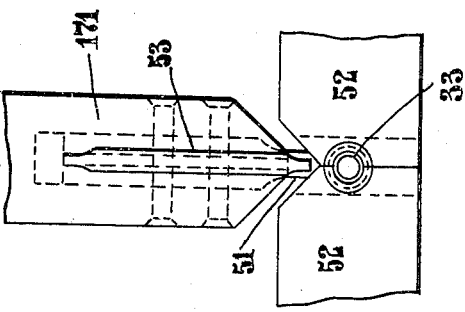
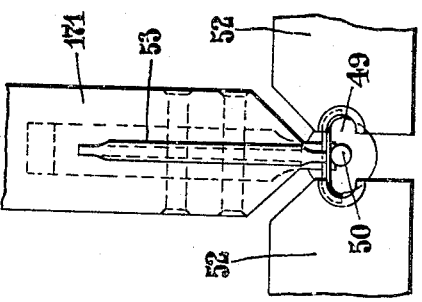
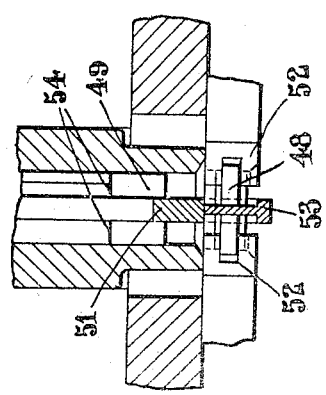
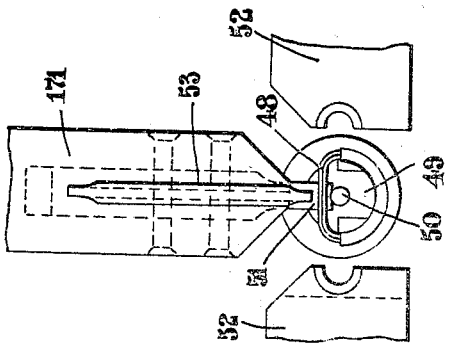
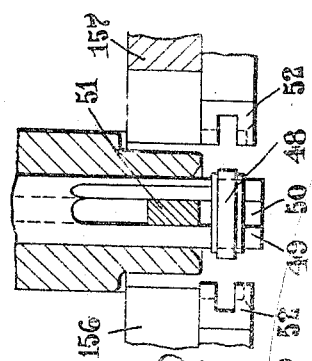

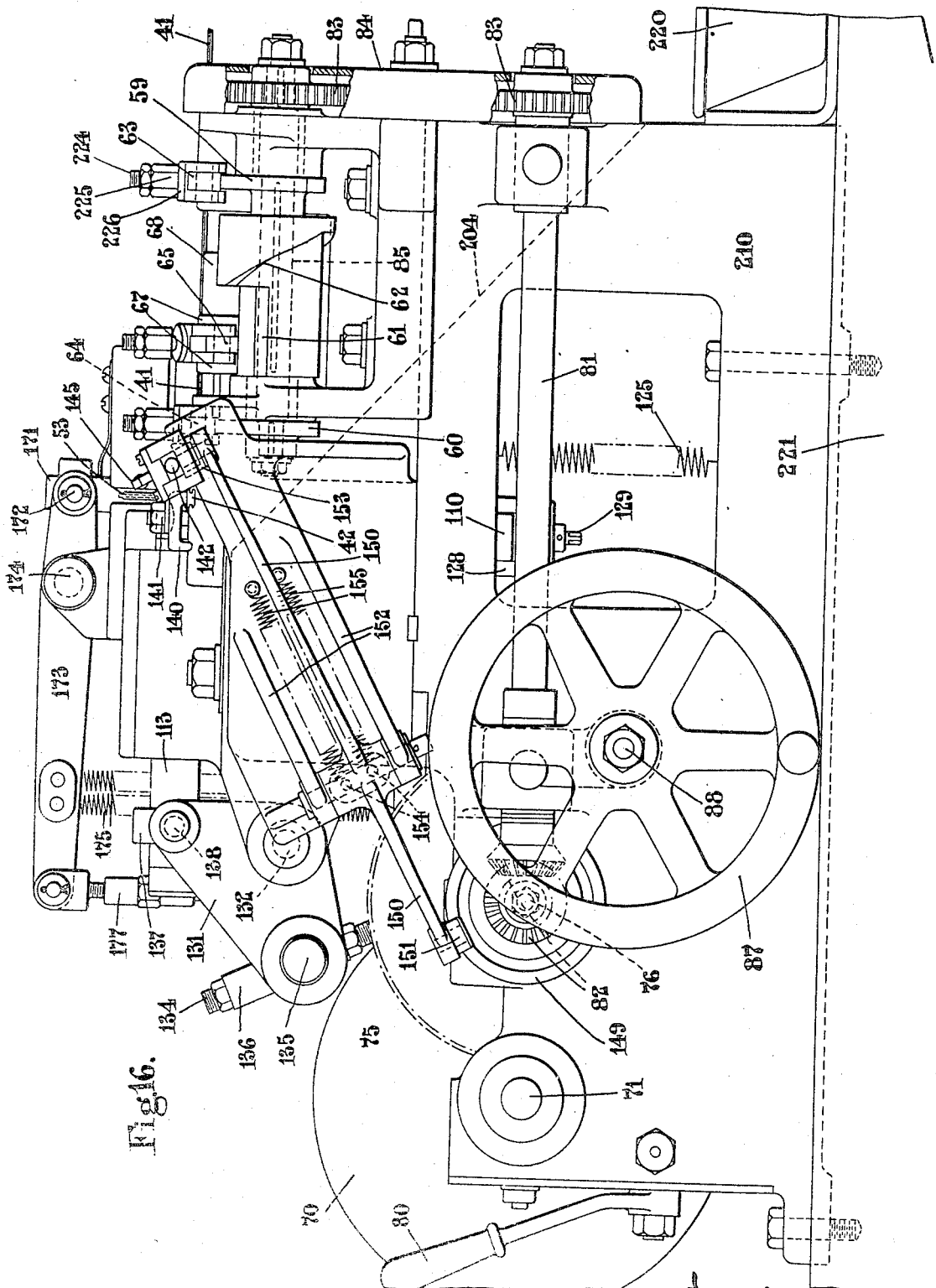

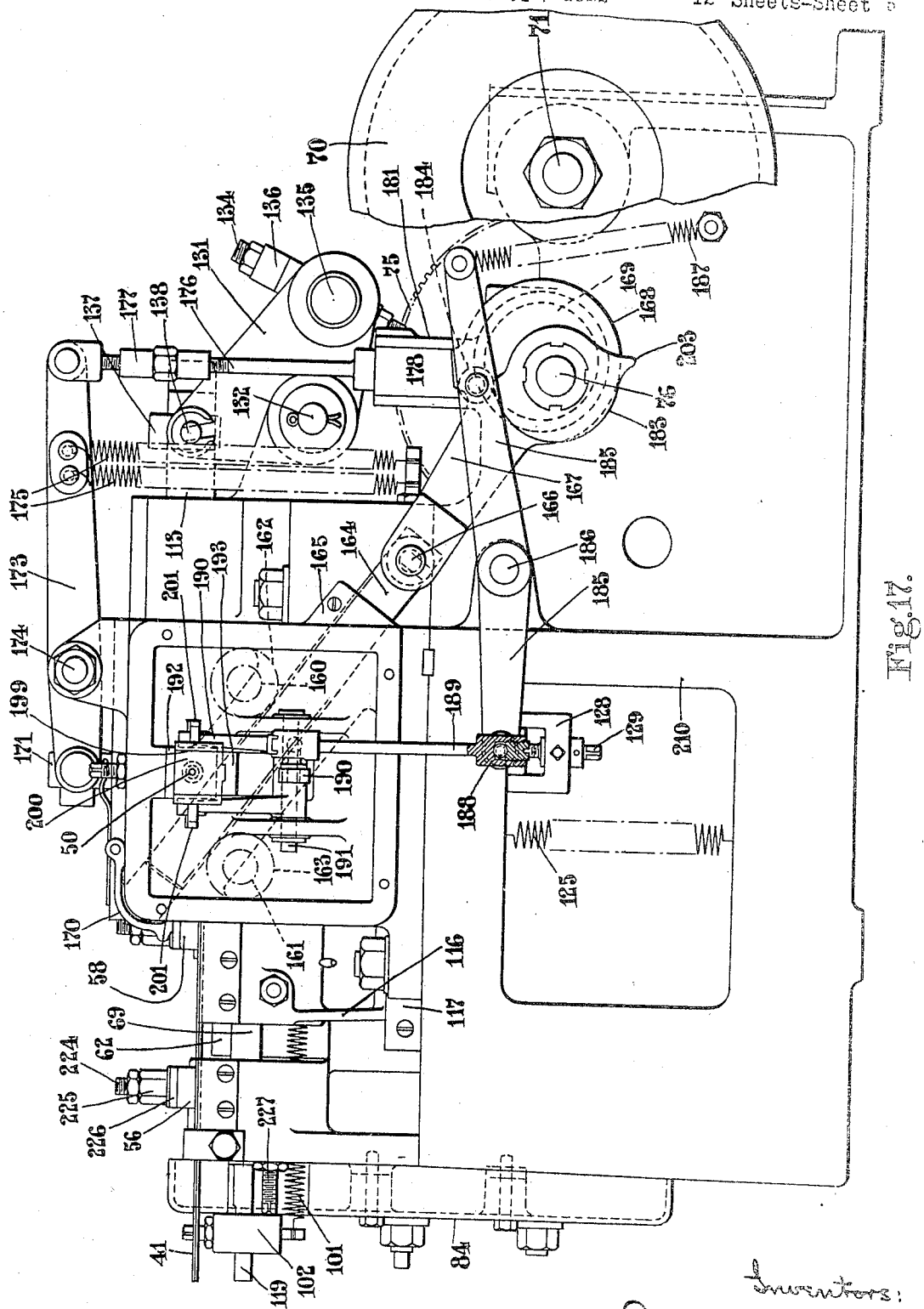

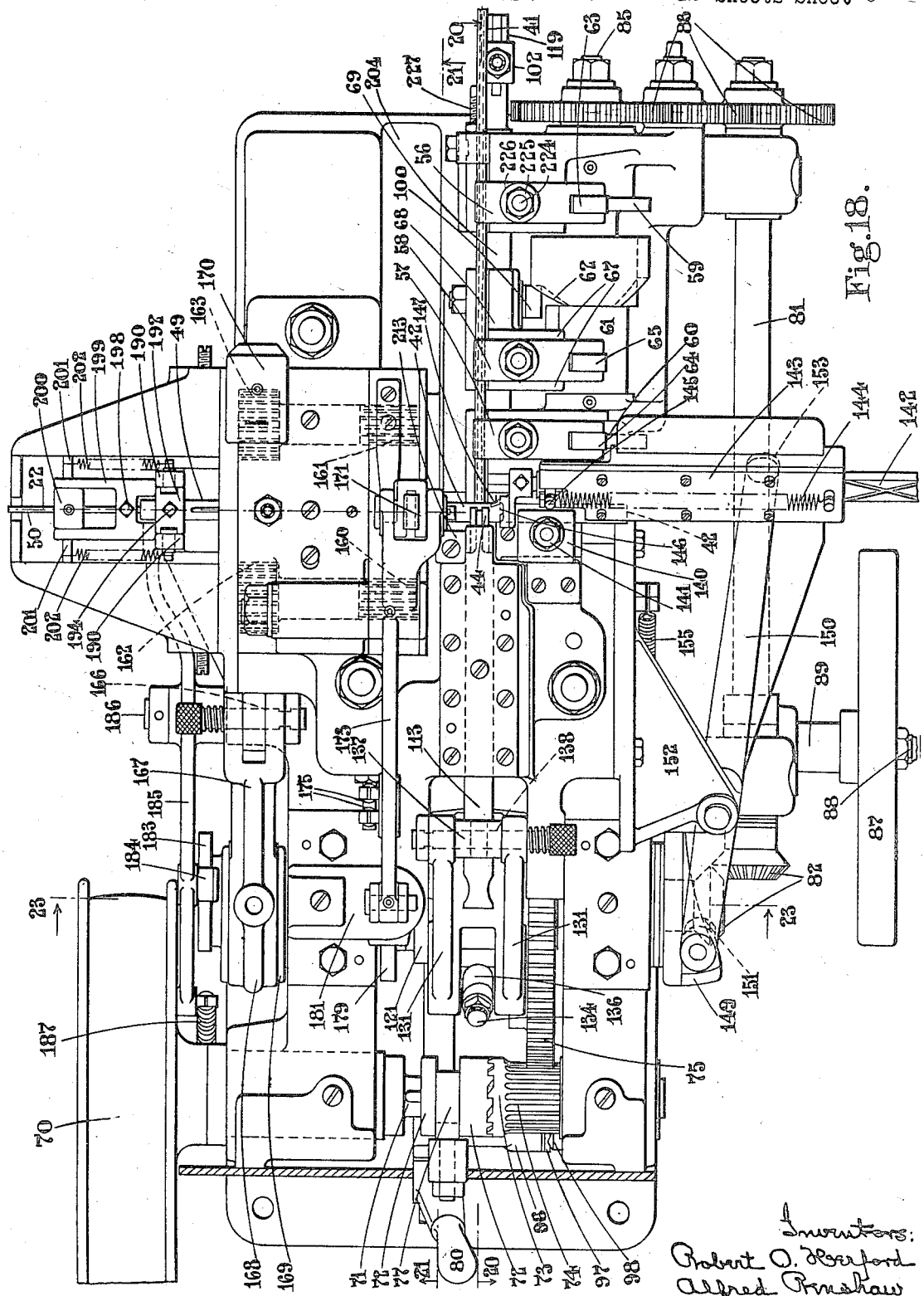

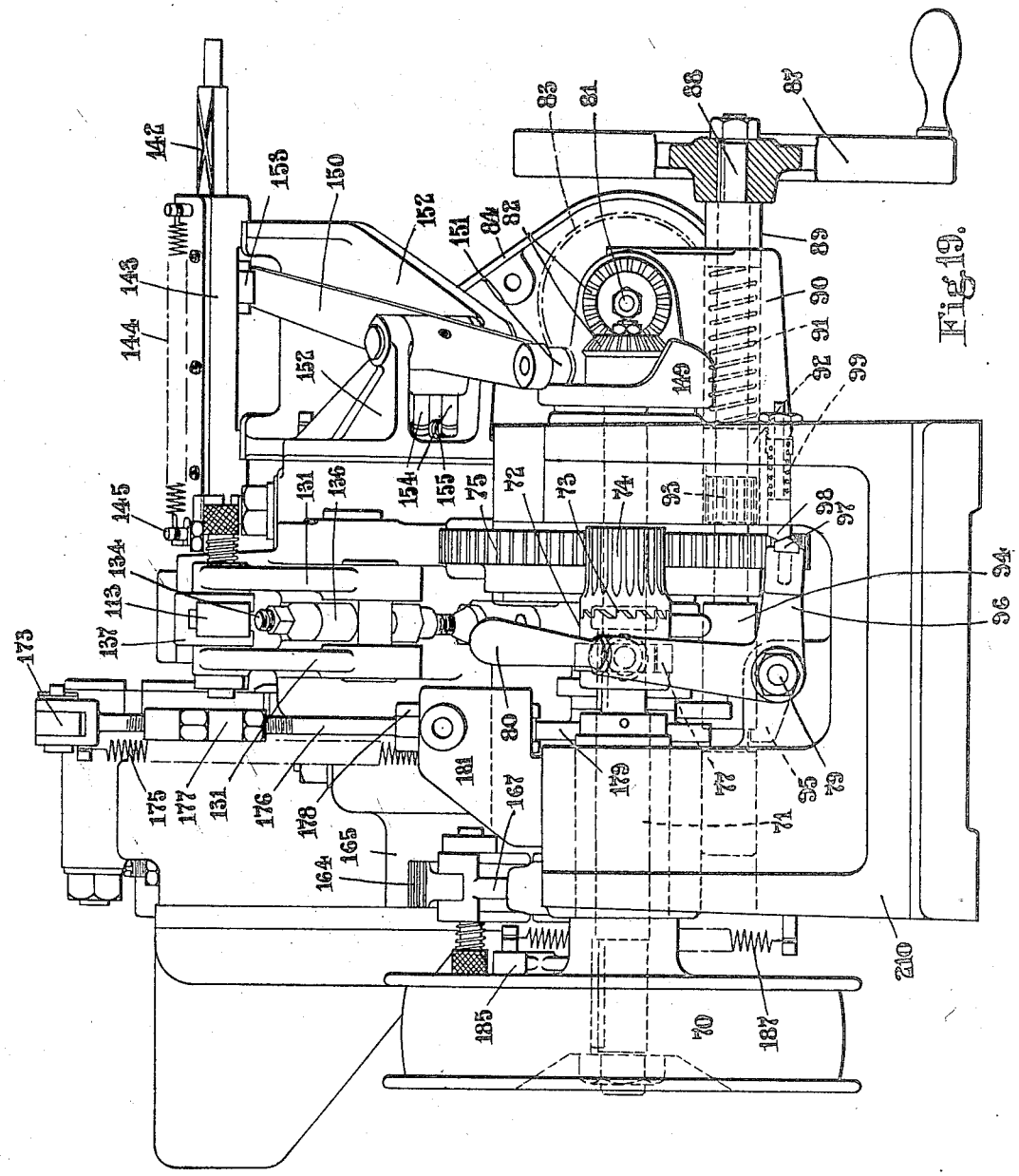

Nov. 13, 1923. 1,473,855
R. O. HERFORD ET AL
METHOD OF AND APPARATUS FOR MAKING BUSHES AND ROLLERS FOR GEAR CHAINS
Filed March 31, 1922   12 Sheets-Sheet 8
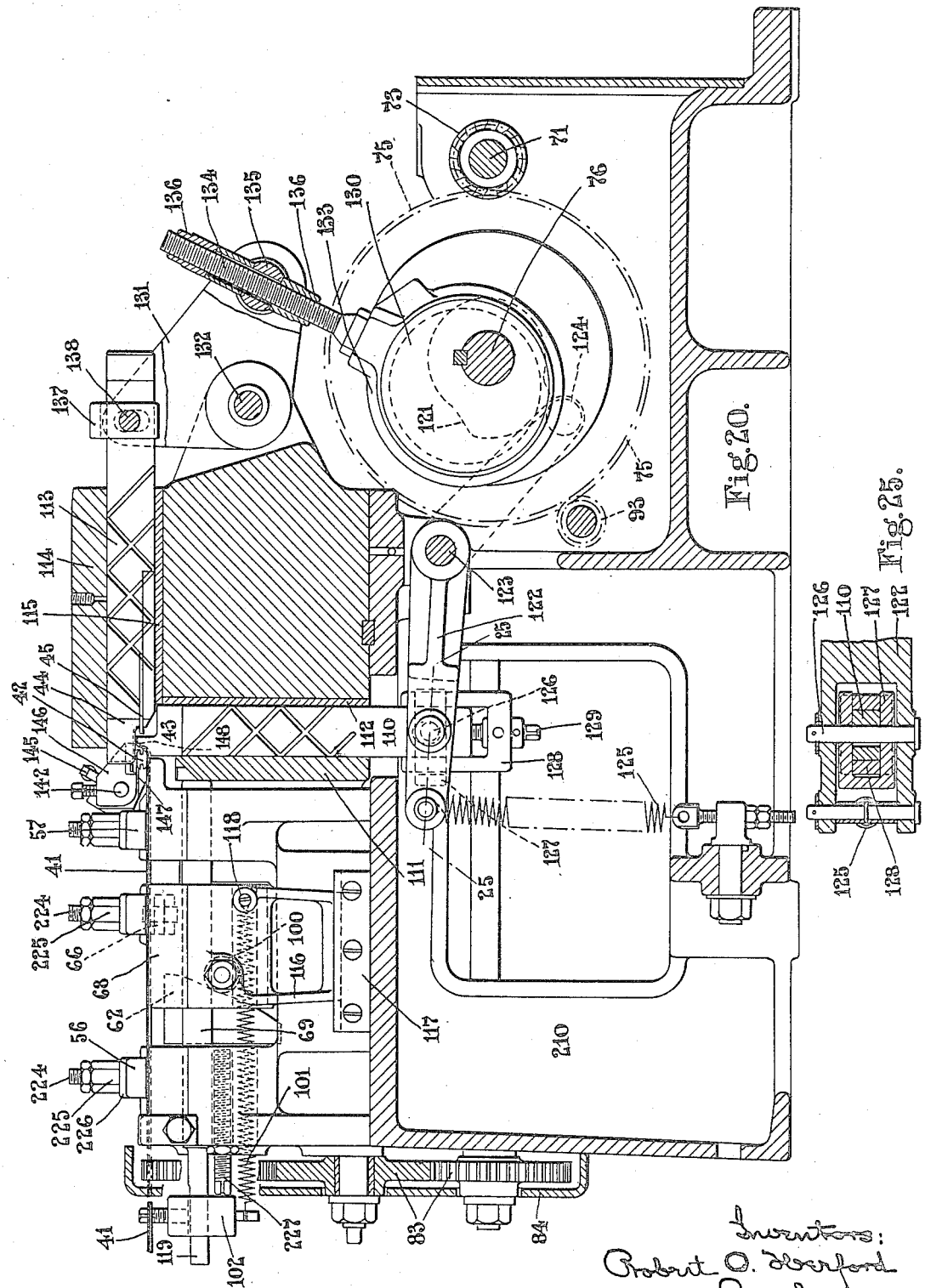

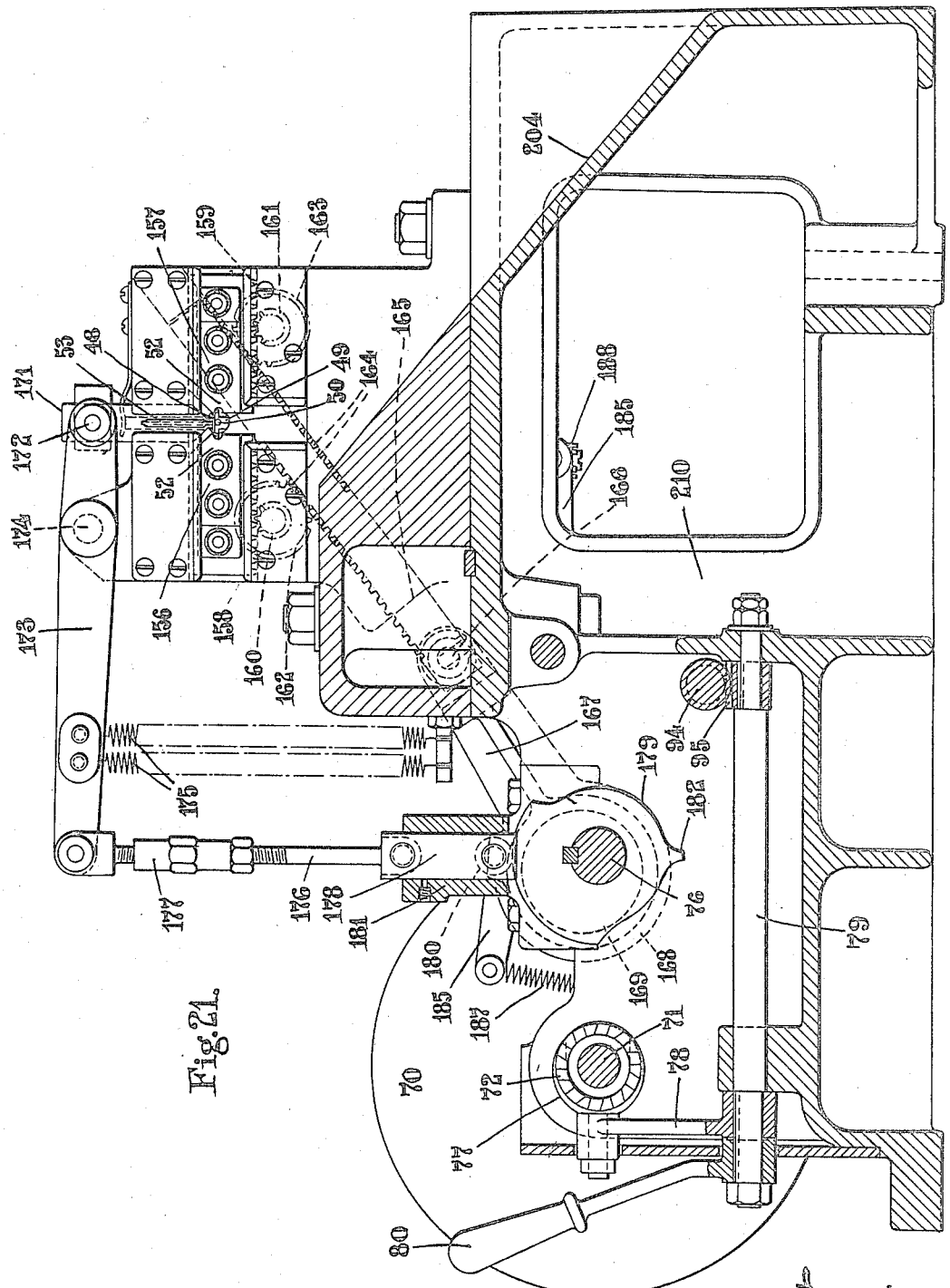

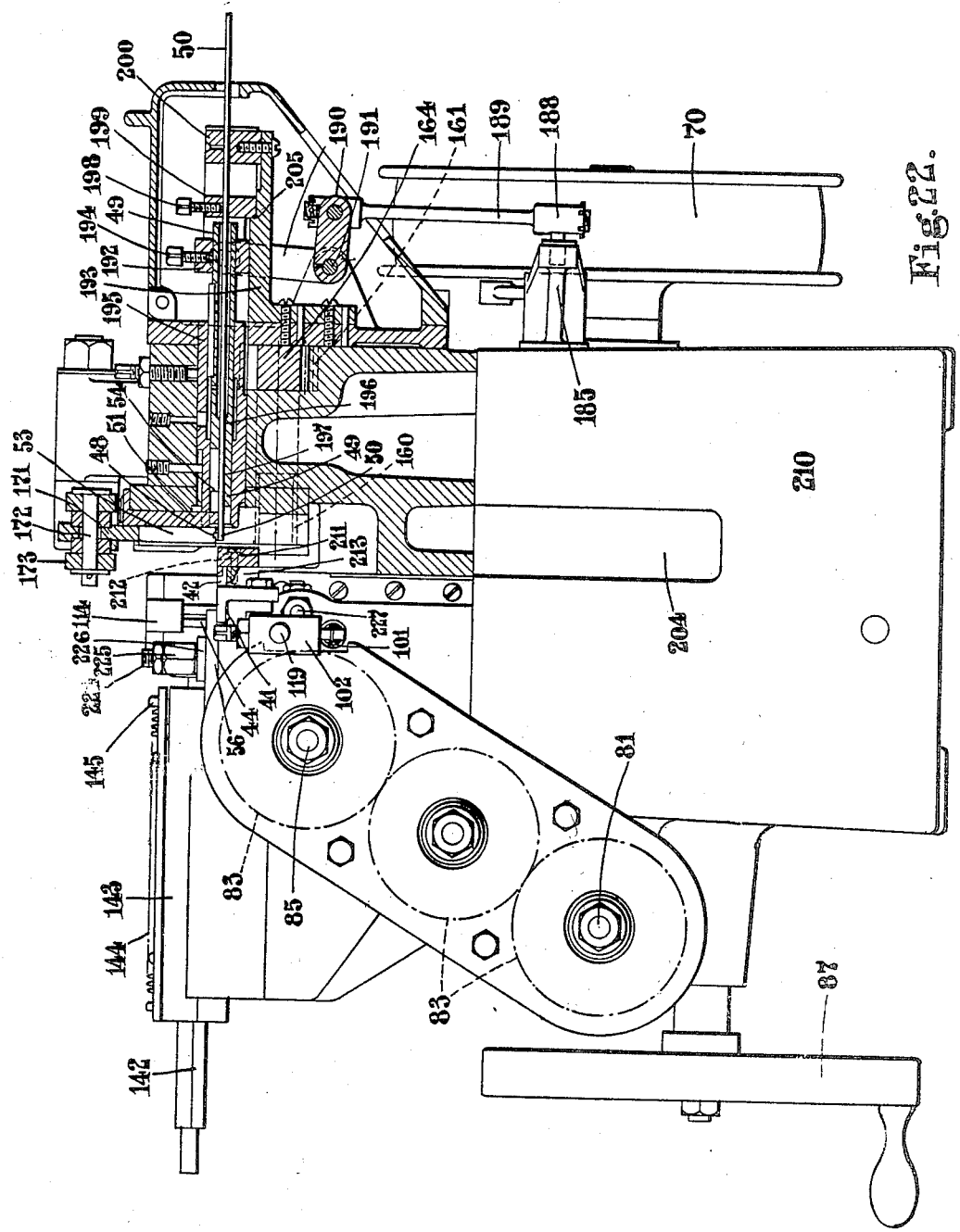

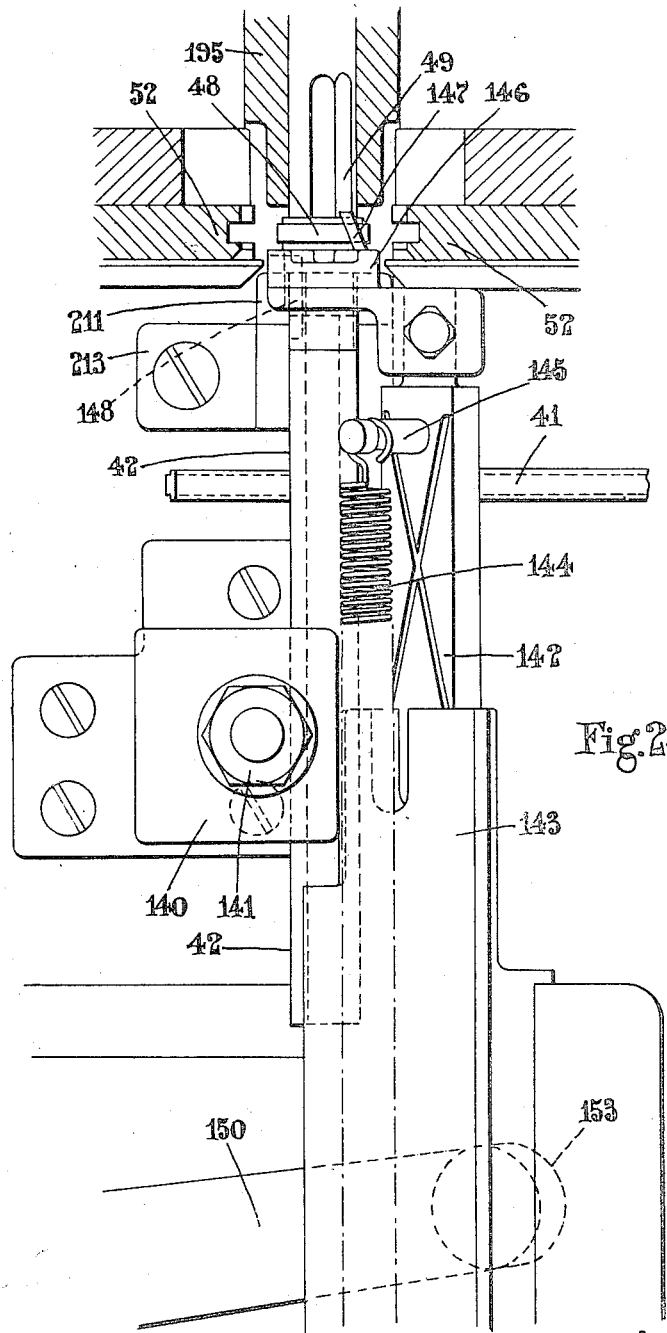

Patented Nov. 13, 1923.

1,473,855

UNITED STATES PATENT OFFICE.

ROBERT OSLER HERFORD AND ALFRED RENSHAW, OF MANCHESTER, ENGLAND, ASSIGNORS TO HANS RENOLD LIMITED, OF MANCHESTER, LANCASTER, ENGLAND.

METHOD OF AND APPARATUS FOR MAKING BUSHES AND ROLLERS FOR GEAR CHAINS.

Application filed March 31, 1922. Serial No. 548,514.

*To all whom it may concern:*

Be it known that we, ROBERT OSLER HERFORD and ALFRED RENSHAW, both subjects of the King of Great Britain, and residents of Burnage Works, Didsbury, Manchester, in the county of Lancaster, England, have invented certain new and useful Improvements in Methods of and Apparatus for Making Bushes and Rollers for Gear Chains, of which the following is a specification.

This invention relates to bushes and rollers used in gear chains, and it has for its principal object to provide for the manufacture of such bushes and rollers by bending and coiling from strip metal. A further object is to provide for the formation of bushes with an enlarged central portion adapted to replace a roller in a gear chain, and with smaller ends adapted to fit in apertures in the inner links of a gear chain, whereby a new type of gear chain is produced which is inexpensive to manufacture, is durable, and efficient in operation. Another object of the invention is to provide mechanism whereby coiled bushes and rollers can be formed from strip metal in such a manner that the ends of each strip section are curved correctly to shape, this result being attained by making bends in a strip before a piece with already bent ends is severed therefrom, and subsequently bending or coiling the middle portion of such strip. Another object of the invention is to provide an efficient and economical machine adapted to produce automatically coiled bushes and rollers from a length of strip metal supplied thereto, such machine comprising bending and parting tools and a bending mandrel whereby sections of the strip metal are formed to an elongated U-shape and are severed from the rest of the strip, transfer mechanism, a coiling mandrel, and coiling tools whereby the pieces of elongated U-shape are closed by coiling so as to form properly shaped coiled bushes and rollers of any required section. These and other objects are attained in the manner hereinafter set forth.

The invention is illustrated in the accompanying drawings, wherein:—

Figure 1 shows in plan view, partly in section, a portion of a chain made according to the present invention.

Figure 2 shows a longitudinal section of such chain on the line 2—2 of Figure 1, Figure 3 is a perspective view on a larger scale showing the coiled bush which has a centre portion of large diameter adapted to replace the roller of a bush-roller chain, and smaller ends for engaging in the apertures of the chain links.

Figure 4 shows an enlarged sectional view of the strip of metal from which the bush as shown in Figure 3 is formed by coiling.

Figures 8 to 15 are similar diagrams, Figures 8, 10, 12 and 14 being elevations and Figures 9, 11, 13 and 15 being sectional plan views, illustrating the successive positions of the parts by means of which the elongated U-shaped pieces are finally curled to the form of a coiled bush as shown in Figure 3.

Figure 16 is a front elevation.

Figure 17 is a rear elevation.

Figure 18 is a plan view, and

Figure 19 is an end elevation as seen from the left-hand side in Figure 16, illustrating a machine having parts therein for performing the operations of Figures 5 to 15.

Figure 20 is a sectional elevation taken on the line 20—20 of Figure 18, looking in the direction of the arrows.

Figure 21 is a sectional elevation taken on the line 21—21 of Figure 18, looking in the direction of the arrows.

Figure 22 is an end elevation as seen from the right-hand side in Figures 16 and 18, partly in section on the line through 22, Figure 18, at right-angles to line 21—21.

Figure 23:
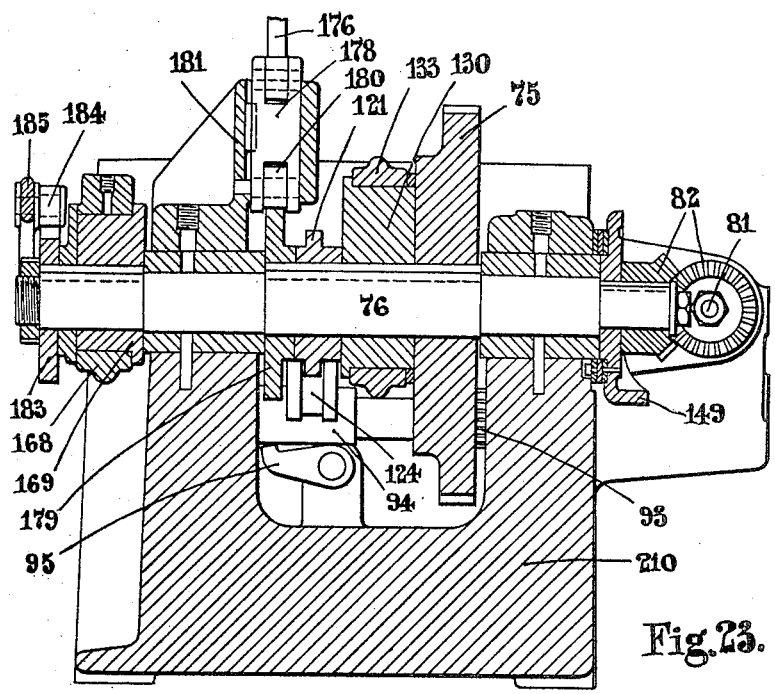

Figure 23 is a section through the cam shaft on the line 23—23 of Figure 18.

Figure 24 shows a detail of the bending mandrel and pusher, as seen in plan, drawn to a larger scale.

Figure 25 is a detail view showing a section on the line 25—25 of Figure 20.

Figure 26 is a diagram illustrating a drifting tool adapted for finishing the coiled bushes accurately to shape, and smoothing the surface of the central portion which replaces a roller in the finished chain.

Referring first to Figures 1 and 2, it will be seen that the chain which it is the principal ultimate object of the invention to produce, consists of inner links 31 and outer links 32, the inner links being united in pairs by the coiled bushes 33, while the outer links are joined by studs or rivets 34 which pass through the interior of the coiled bushes 33. The external surfaces of the bushes 33 where exposed between the links 31, act as fixed rollers in engaging with the teeth of sprocket wheels of the type usually employed for roller chains. The bushes have reduced ends or necks 35 which are forced into the holes formed in the links 31, the ends of the larger middle portions of the bushes constituting shoulders limiting the inward movement for the links 31 when being forced into engagement with the necks 35. In Figure 3, 36 represents the radial plane of division in the coiled bush where the ends have been brought together in forming the bush from a strip. Figure 4 shows to an enlarged scale a section of a suitable strip of metal for use in forming the coiled bushes. It will be seen that the back of the ridge 37 is rounded while the inner face 38 of the strip is flat or substantially so. The corners at 39 should be sharp angles but the edges of the flanges of the strip may be rounded as at 40, in order that the ends of the necks of the bushes may be rounded to facilitate assembly in the links. The arched shape of the ridge 37 renders the strip thicker at the middle than near the sides of the ridge, this shape being selected because in the coiling operations the drawing action upon the metal is greatest at the centre line. The shape selected in fact is such that, when coiled, the outer and inner faces of the bush become as nearly as possible perfect cylindrical surfaces, or even surfaces which are still a little barrel shaped, to allow for a final drifting operation in which the surfaces are trued. The strip of metal for coiling may be formed to the required cross section by drawing, rolling or any other suitable method, and the cross-section may be varied according to the required final shape and dimensions of the bushes, as will be obvious.

In the making of the bushes by coiling from strip metal a very great saving is effected as compared with the cost of turning a bush and a roller from solid metal stock, or even as compared with the cost of turning a combined bush and stationary "roller" exactly of the shape shown in Figure 3 from solid stock. There is not only a great saving in metal but also in the size and number of machines required for a given output, and in the floor space occupied, the labour or attendance required and so forth.

The method of making the coiled bushes will be best understood by reference to Figures 5 to 15. First, however, it will be well to indicate the nature of the problem to be solved. If sections were cut from the strip each of the required length for forming a bush, and if the attempt were made by pressing tools to bend these strips directly around a mandrel corresponding in size to the interior bore of the finished bush, the middle part of each length of strip could be bent to shape, but the parts near to the ends of the strip section would inevitably fail to be shaped correctly because it would require an infinite bending moment to bend inwards the final piece at each end. In fact the ends would be tangential to the circle of the mandrel no matter what pressure was applied. By the method of bending according to this invention the parts which are to form the ends of each strip section are bent to shape while forming part of the strip and before they are severed from the rest of the strip.

Figure 5:
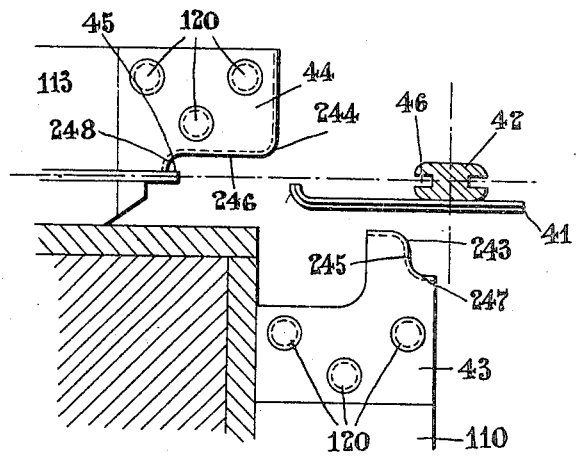
Figures 5 to 7 are diagrams showing in section in three successive positions the parts by which the lengths of the strip are formed to an elongated U-shape with their ends ready curved to a substantially circular curvature.

In Figures 5 to 7, 41 is the strip, 42 shows in cross-section a mandrel with rounded corners around which the strip is bent, while 43 and 44 are two bending tools sliding in suitable guides. Each tool 43, 44 has a rounded nose portion 243 and 244 as shown, which effects the bending, followed by a straight portion 245 or 246 which flattens the bent limb against the face of the mandrel 42, and finally an inwardly curved portion 247 or 248 which may press the bent portion of the strip against the rounded corner of the mandrel. The tool 44 has a blade 45 secured in it and adapted to enter a recess at 46 in the mandrel to crop off the lengths of strip with their bent ends. In the position of Figure 5 the tool 43 is rising, and by the time it has reached the position of Figure 6 it has bent up a length of the strip around the left-hand face of the mandrel 42 as shown, and its curved surface 247 may have pressed the bend against the rounded corner of the mandrel. The tool 44 is advancing during this time, and its nose passes over the top of the tool 43 before this latter has descended, the tool 44 passing across the top of the mandrel, and making a second bend in the strip. The holding of the first bend by the tool 43 while the second tool 44 is bending the strip over the second rounded corner of the mandrel, prevents any distortion or displacement of the first bend in the formation of the second bend. By the time that the position of Figure 7 has been reached, the tool 43 has descended, and tool 44 has completed its movement, while the blade 45 has cropped off the bent end of the strip by punching a piece of metal 47 into the recess 46 in the mandrel. The tool 44 now recedes leaving a length 48 of metal of elongated U-shape resting on the top of the mandrel 42, both ends of this piece of metal having been bent while in the strip to the required shape, so as to form as nearly as possible quarter circular arcs in the finished bush. When the tool 44 has receded, a further length of the strip is fed forward as in Figure 5, this length having its end already curved by the operation of the tool 43 as above described. Hence, at each cycle of operations as in Figures 5 to 7, an elongated U-shaped piece 48 is completed; this is pushed longitudinally along the mandrel 42 in order that its coiling may be completed by a second set of tools, while also the punched-out bit of metal 47 is ejected by an attachment upon the pusher which transfers the U-piece 48.

Referring now to Figures 8 to 15, the numeral 49 represents a transferrer platform, and 50 a round mandrel, these two being movable longitudinally so that they can receive the U-piece 48 when pushed longitudinally off the mandrel 42. The platform 49 has a shoulder at 54 forming a stop against which the U-piece 48 comes to rest when in the right position to be gripped by the coiling jaws 52. The round mandrel 50 slides under a stationary guide block 51, in front of which is a vertically moving gripper 53 which latter serves to grip the U-piece upon the mandrel and to hold it while the platform 49 recedes further as in Figures 10 and 11. The coiling jaws 52 are now approaching from opposite sides and they grip upon the bent ends of the U-piece 48 just as the platform 49 passes back out of the way. From the position of Figures 10 and 11 the jaws 52 approach further until just before they finally close around the mandrel 50 as in Figures 12 and 13, the gripper 53 is lifted so that the jaws can meet over the top of the bush also. The bush is now completed in its final form, and is marked 33 in Figures 12 to 15. The jaws 52 open again as in Figures 14 and 15, and the mandrel 50 moves back together with the platform 49 until the front end of the mandrel 50 is at the place marked 55 in Figure 15. The stationary guide 51 insures that the bush 33 is stripped from the mandrel as this latter recedes, and the gripper 53 now makes a sudden downward movement in order to insure that the coiled bush 33 is knocked down and falls into the receiving shoot. The gripper 53 rises again at once, while the jaws 52 move apart again fully, and the platform 49 with mandrel 50 are advanced ready to receive the next U-piece 48 as in Figures 8 and 9.

It will be seen that by the sequence of operations above described, the ends of the strip sections are bent truly to shape before the sections are severed, after which the middle portions of the strip sections are shaped by bending around the mandrel 50, bringing the already shaped ends of the strip sections together upon the mandrel. These ends are pressed tightly together by the jaws 52 but the jaws are not required to bend the ends at all.

It will be convenient now to describe at once the preferred form of machine in which the operations of Figures 5 to 15 are carried into effect. The parts already referred to in Figures 5 to 15 are numbered correspondingly in Figures 16 to 25. The machine is power driven by belt pulley 70 which also serves as a fly wheel. The shaft 71 on which the pulley 70 is mounted carries a clutch member 72 splined thereon and normally engaging a clutch member 73 on which is formed a pinion 74 gearing with toothed wheel 75 on a cam shaft 76. The clutch member 72 is actuated by a fork 77 carried by a lever 78 which is keyed on spindle 79. This spindle is turned by a hand lever 80 for throwing the clutch member 72 into and out of engagement with clutch member 73. The cam shaft 76 drives a shaft 81 extending along the front of the machine, through bevel gears 82, and the right-hand end of shaft 81 is connected through a train of gears 83 (shown in Figures 20 and 22 as enclosed in a gear case 84) to a second cam shaft 85 whose function is to control the feed and gripping of the strip 41.

For hand operation, for example in inserting the strip 41 and setting the machine ready for power operation, a hand wheel 87 is provided. This is mounted on a shaft 88 which carries a sliding bush 89 working in a guide bracket 90, and normally pressed out as shown by the action of a spring 91, Figure 19. This spring bears at its other end against a fixed bush 92 through which the shaft passes, and the part of the shaft just beyond this bush carries a pinion 93. By pressing the hand wheel 87 inwardly against the action of spring 91, the pinion 93 is brought into mesh with toothed wheel 75 on the cam shaft 76.

It is desirable to prevent the hand wheel 87 from being pressed in when the power drive is applied, and to prevent the power drive from being applied while the hand wheel shaft is pressed in, as otherwise accidents might occur due to the sudden movements of the hand wheel, the projecting handle of which might strike the operator. This result is attained by providing the hand wheel 88 with a cylindrical boss 94 on its inner end, as seen in Figures 19 and 21, and mounting on the spindle 79 of the clutch lever 80 an arm with a projecting nib 95 which, when the clutch is engaged as in Figure 19, projects into the path of the cylindrical boss 94, thus preventing the hand-wheel shaft 88 from being pressed inwards. Obviously also if the clutch lever 80 were moved over toward the left in Figure 19 so as to disengage the clutch parts 72, 73, the projection 95 would be moved out of the path of the cylindrical boss 94, and then if the hand-wheel were pressed inwards in order to move the machine by hand, the projection 95 engaging under the face of the cylindrical boss 94 would prevent the clutch lever 80 from being thrown over. The clutch lever 80 has an arm 96 carrying a pin 97 the head of which has inclined faces adapted to bear against corresponding faces on a plunger 98 pressed outwardly by a spring 99. The object of this is to ensure that the hand lever moves over fully into the engaging position or into the disengaging position, and that it cannot be moved unintentionally.

Reverting now to the cam shaft 85, it will be seen from Figures 16 and 18 that this carries three circumferential cams 59, 60 and 61, and a face cam 62. The function of these cams is to operate grippers which hold and feed the strip 41. The two pivoted grippers 56, 57 are operated by the cams 59 and 60 by means of rollers 63 and 64 on the tail ends of the grippers bearing upon such cams. The gripper 58 similarly has a roller 65 bearing on a cam 61. Each of the grippers rocks on a pin such as that indicated in dotted lines at 66 in Figure 20 for the gripper 58, and the gripper works between side cheeks 67 which hold it strongly in a lateral direction while allowing of its rocking movement in a vertical plane. Tension bolts 224 pass through slots in the grippers and nuts 225 thereon support washers 226 which take the upward pressure when the rollers are raising the rear ends of the grippers for engaging the strips at their front ends. The grippers 56, 57 are holding grippers having no lateral movement, but the gripper 58 is mounted on a slider 68 movable laterally on a rod 69 carrying a roller 100 which works against a face on the cam 62 in order to impart a lateral movement to the slider 68 and gripper 58. The slider 68 is also supported by means of a foot 116 (Figures 17 and 20) working on a guide plate 117. The slider 68 is pulled in the direction to keep the roller 100 against the cam face 62 by means of a spring 101 (Figures 17 and 20) which passes through a boring in the slider 68 and is attached to a pin 118, while the other end is connected to an adjustable clamp 102 on a projecting stud 119. As the cam shaft 85 rotates therefore the grippers 56 and 57 are opened and closed at intervals determined by the positioning of their cams 59 and 60, while the gripper 58 is opened at intervals and is closed by the action of its cam 61 and is moved laterally by the action of the cam 62. During the forward feeding movement of the strip 41 the grippers 56, 57 are opened while the gripper 58 having been moved toward the right in Figure 18 (toward the left in Figures 17 and 20) while open has been gripped upon the strip 41 under the action of the cam 61, and is then moved forwardly by cam 62 so as to feed forward a length of the strip. When the strip length has been fed forward the grippers 56, 57 close upon the strip, the gripper 58 being then opened and moved back again by the action of spring 101 ready to engage with the strip at a point further back and to feed forward another length thereof. The set screw 227 serves as an adjustable stop limiting the backward movement of the slider 68 at any required point, in order to adjust the length of the strip 41 which is fed at each movement of the slider 68.

Figure 6:
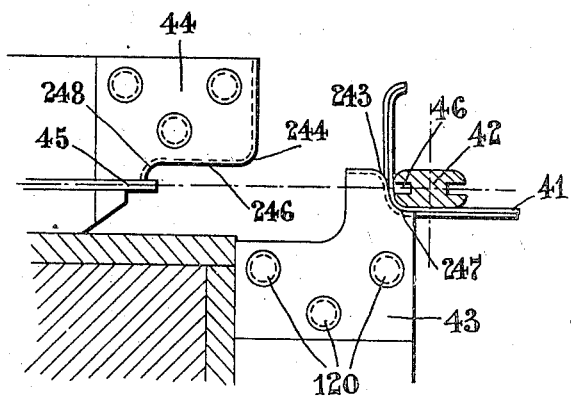
Figure 7:
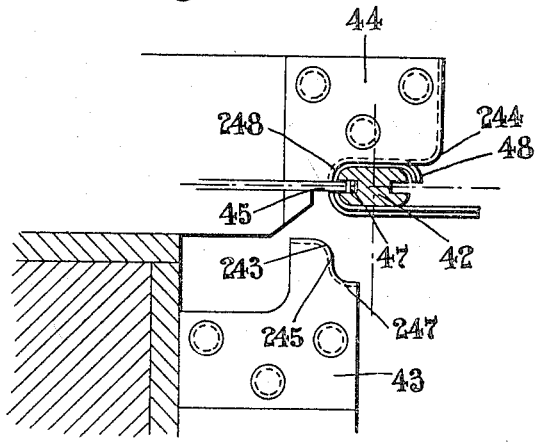

The strip lengths as they are fed forward are operated upon by means of bending tools 43, 44, as already described with reference to Figures 5 to 7, in order to bend the strip around the mandrel 42, and to cut off the U-piece 48 when formed as in Figure 7, by the plate 45 punching out a short section of metal 47 into the groove 46 in the mandrel 42. In Figure 20 the parts shown in Figures 5 to 7 are indicated in their position in the machine. The bending tool 43 is mounted on a slider 110 which moves vertically between two hardened steel guide faces 111 and 112, while the bending tool 44 is similarly mounted on a slider 113 which works between two hardened steel guide faces 114 and 115. Each of the bending tools 43, 44 is preferably made up of a central plate corresponding with the width of the ridge of the strip 41, this central plate being shown in one with the slider 110 or 113, and two attached side plates which extend over the flanges of the strip 41, and may be secured at either side of the central plate as by rivets 120. The side plates of course extend beyond the central plate as indicated by dotted lines representing the edge of the central plate in Figures 5, 6 and 7 and Figure 20, in order that they may bear on the flanges of the strip while the central plate bears on the ridge.

The sliders 110 and 113 are operated from the cam shaft 76. A cam 121 operates the slider 110 by means of a lever 122 pivoted at 123, and carrying a roller 124 at its rear end which bears on the cam 121. At its other end the lever is pulled down by a spring 125 which maintains the roller 124 pressed against the cam, while a cross pin 126 on the lever 122 passes through a slot in the slider 110, and through holes in a fork 127, Figure 25. This fork slides in grooves in the faces of a yoke-piece 128 embracing the end of slider 110 and positively connected to it by set screw 129. The object of this form of connexion is to insure accurate positive movement of the slider 110 as the lever 122 moves. An eccentric 130 operates the slider 113 through an elbow lever 131 pivoted at 132, and operated from the strap 133 of the eccentric through its threaded rod 134 engaging with a slotted cross-pin 135 on lever 131 by means of adjustable nuts 136. The lever 131 is partly broken away in Figure 20, showing the fork 137 which engages in grooves in the end of the slider 113 as seen in Figure 18, and positively transmits the movements of lever 131 to slider 113, because the pin 138 which passes through a slot in slider 113 engages in circular holes in the cheeks of lever 131 and in fork 137. The sliders 110 and 113 have cross-grooved faces as seen in Figure 20 in order to provide for the effective distribution of lubricant.

The mandrel 42 is preferably made as a long bar which is clamped in position by a plate 140 and nut 141 so that as one part of it becomes worn, its end can be cut or ground off, and the bar adjusted to bring a fresh part of its length into position in line with the strip 41 as fed in. The mandrel is also preferably made as shown with all its corners rounded and a groove at 46 in each side face, so that the mandrel, when worn in one position, can be turned on its axis through 180° to bring its opposite faces into position for bending and cropping. The forward end of the bending mandrel 42 is preferably cut away as seen in Figure 22, and a lip on a plate 211 engages over the end of the mandrel, this plate being secured by a screw 212 to a block 213 which is best seen in plan in Figure 18. A slider 142 operating in a guide 143, is normally drawn outwardly by a spring 144 engaging with a stud 145 on the slider. The inner end of the slider 142 carries a transfer arm or pusher 146 which rides upon the top of the mandrel 42 and the plate 211 at the end thereof, and serves to push the formed U-pieces 48 along said mandrel on to the platform 49. In order to prevent dragging back of the U-pieces by the receding bending tool 44, the pusher 146 is provided with a projecting tooth 147 which is advanced by the motion of the pusher 146 so as to overlie the top of the U-piece 48 before the bending tool 44 has receded out of contact with the U-piece. A projection 148, Figure 24, on the pusher always lies in the groove 46 in the side of the mandrel 42, and as the pusher advances this projection ejects the scrap 47 from the groove. The slider 142 carrying the pusher 146 is operated from a cam 149 on cam shaft 76 through a lever 150. This lever has a roller 151 bearing on the cam face. The lever is pivoted upon brackets 152, and its upper end has a connexion at 153 with the slider 142, this connexion being of a suitable type allowing for the movement of the lever end in a circular arc. A stub arm 154 projects from the lever 150 behind the pivoting axis, and is acted upon by springs 155 tending to pull the upper end of the lever 150 outwards, and thus to draw the slider 142 backwards after a pushing movement. The object of spring 144 is mainly to take out any backlash in the movement of the slider 142 relatively to its operating lever 150.

The operation of the parts for effecting the feed of the strip, the bending thereof, the cropping off of the U-pieces 48 and their pushing forward on to the platform 49 has now been described, and it only remains to describe the operation of the parts of the machine referred to in connexion with Figures 8 to 15.

The coiling jaws 52 are upon sliders 156, 157 which are formed with rack teeth at 158, 159 on their under edges as indicated by dotted lines in Figure 21. Pinions 160, 161 gear with these racks, these pinions being integral respectively with pinions 162, 163 lying further back as seen in Figure 21. The pinions 162 and 163 gear with the teeth of a double toothed rack bar 164, which is guided so as to slide diagonally in the casing 165, Figure 17, and is pivotally connected at 166 to the rod 167 of an eccentric strap 168 embracing eccentric 169 on the cam shaft 76. A cover 170 normally closes the upper end of the guide slot for the rack bar 164, but can be raised to give access thereto for lubrication and so forth.

The gripper 53 which holds the U-pieces 48 on the mandrel 50 while the coiling jaws 52 are engaging with and commencing to bend the middle part of the U-piece 48, is operated as follows: The gripper 53 itself is mounted in a plunger 171 (Figures 21 and 22) connected by a joint 172 similar to that already described, allowing of relative angular movement, with a lever 173 pivoted at 174. This lever is pulled in the direction to raise the gripper 53 by means of springs 175 and has connected to it at its rear end a rod 176 with a turn-buckle 177 provided with right and left-hand screw threads in order to allow of accurate adjustment of the length of the rod 176. The rod 176 is linked to a sliding block 178 working in a guide 181, and carrying at its lower end a roller 180 (Figure 23) which bears upon the surface of a cam 179 on the cam shaft 76. The shape of this cam is best seen in Figure 21. It is there seen in a position in which the principal dwell on the cam is in action holding the gripper upon the mandrel 50. As the cam turns the roller 180 passes off the raised dwell on the cam, just before the coiling jaws 52 meet around the mandrel 50, in order that the gripper 53 may be lifted clear. After an interval during which the mandrel 50 is withdrawn and the jaws 52 are opened, the projection 182 of the cam 179 presses up the rear end of the lever 173 momentarily for the purpose of imparting a sharp downward movement to the gripper 53 for knocking off the finished bush 33 as in Figure 14.

The mandrel 50 and platform 49 are operated as follows: A cam 183 on the rear end of the cam shaft 76 has a roller 184 bearing upon it, this roller being mounted on a lever 185 pivoted at 186. A spring 187 pulls down the projecting end of the lever 185 so as to keep the roller 184 pressed against the cam 183. At its other end the lever 185 is connected by an adjustable pivotal connexion 188, seen in section in Figure 17, to a rod 189 connected to the horizontally projecting arm of an elbow lever 190 pivoted at 191. The upwardly projecting arms of the lever 190 are connected by a sliding connector device of a type already explained, to a block 192 which slides on a table 193. This block has a set screw 194 therein by which it is connected to the tubular rear end of the platform 49 sliding in the guideway 195 (Figure 22). The rod forming the mandrel 50 passes through the open tubular portion of the platform 49, being a sliding fit therein at 196, and resting upon the slot in the upper surface of the platform at the part 197 up to the front end thereof. The rod 50 is connected by a set screw 198 to an H-shaped slider 199, the outer limbs of which bear against the side faces of a fixed block 200, as seen in Figures 18 and 22. The rod 50 passes through a guide passage in the block 200, as seen in Figure 22. The arms of the slider 199 have pins 201 thereon which are pulled inwardly by springs 202 so as to tend always to move the slider 199 together with the rod 50 inwardly. In its most advanced position, as in Figure 9, the platform 49 is just clear of the plate 211 at the end of the bending mandrel 42, and in this position the end of rod 50 which forms the coiling mandrel is in the position for coiling the U-piece around it. As the elbow lever 190 is moved backwardly under the action of the cam 183, the platform 149 is first moved alone in order to leave the mandrel 50 projecting for the coiling operation. At the end of the coiling operation the elbow lever 190 experiences a further movement under the action of a projection indicated at 203, Figure 17, on the cam 183, and this further movement carries the block 192 bearing against the projections of the H-shaped slider 199 to draw back the rod 50 whose front end forms the coiling mandrel, while the platform 49 makes a further backward movement. In Figures 17 and 18 the parts are shown in the position in which the coiling around the mandrel 50 is about to take place, the block 192 being just in contact with the end of the H-shaped slider 199, ready for drawing back the mandrel 50 with the platform 49 when the projection 203 on cam 183 strikes against the roller 184. This takes place after about half a revolution of the cam shaft 76. When the projection 203 passes the roller 184, the platform 49 and mandrel 50 move forward again together until the mandrel reaches its fully advanced position, when the H-shaped slider 199 comes to a stop against an abutment 205 on the table 193, and the mandrel 50 can advance no further. During the further movement of the elbow lever 190 under the action of the spring 187, the platform 49 only advances into the position for receiving the U-piece 48 which is fed forward by the pusher 146. After the U-piece 48 has been received the platform 49 is drawn back again under the action of the cam 183 ready for the next coiling operation. The coiled bush which falls off when the mandrel 50 is drawn back, falls upon an inclined surface 204 (Figure 21) down which it rolls into any suitable receptacle 220 (Figure 16) placed to receive the finished bushes. The inclined surface 204 forms part of the general frame of the machine which is numbered 210 in the drawings, and is made in any convenient number of parts to carry the operating mechanism hereinbefore set forth. It may be mounted on any suitable base, pedestal or table 221 (Figure 16).

When the coiled bushes 33 are delivered from the machine described so far, the surface of the rib forming the fixed roller is even, but is not polished. In order to impart a finish to the bushes and to bring them as accurately as possible into a cylindrical shape, they may be passed through a die in any suitable form of drifting machine. Figure 26 indicates diagrammatically such a form of machine. 206 is the ram of the drifting machine having a plunger 207 with a pin 208 at its end on to which the bushes 33 to be passed through the die are threaded. The drifting die is marked 209, its upper end being enlarged so that the bushes 33 will readily pass into it, the die then contracting in order to compress and impart a finish to the surface of the bushes. Machines suitable for this purpose are well known as applied to other analogous purposes, and the diagrammatic Figure 26 will serve sufficiently to indicate the type of machine in question. It may be a machine having automatic feeding means so that it operates at high speed.

Although bushes 33 have been described as applied to chains of the type shown in Figures 1 and 2, yet it will be understood that coiled bushes or rollers made in the machine as hereinbefore set forth can be applied to other purposes of a similar character. For example, bushes may be formed in the machine and rollers may similarly be formed which will turn on such bushes or on other types of bushes such as are already known. The machine is well adapted for making small rollers for this or any similar purpose, either with or without a ridge in the middle and flanges of smaller diameter at the end. The bushes which are made also need not necessarily be closed so as to form complete cylinders, but if the mandrel 42 were narrow so that the U-shaped pieces 48 were shorter in the middle, the machine would make bushes which were not completely closed, i. e., segmental bushes such as are sometimes used in chains. The applications of the machine and of the method of production for which the machine is designed, obviously therefore extend to any such modifications in the form and uses of the product. The shape of the mandrel 42 and the number of bending tools employed may be varied according to requirements, and also the number of coiling jaws 52, as it will be obvious that several of such jaws could be made to operate simultaneously or in succession over different arcs of the mandrel if required. If the jaws 52 were cut away a little at the top, the gripper 53 might continue to grip the bush against the mandrel 50 while the jaws 52 closed thereon. The construction illustrated however is generally preferable. The jaws 52 are shown as being cut away in the middle part, only their side plates acting on the ends or necks of the bushes in effecting the coiling. This is all that is necessary for small or short bushes, but for larger or longer bushes the jaws may be formed to act on the enlarged part of the strip as well. In this case the jaws 52 may be built up of side plates connected to a metal plate as has been described for the bending tools 43 and 44. These and other modifications will require no further description here.

In making up chains with the coiled bushes 33 therein it is not essential that the place 36 at which the coiled ends of the bushes meet, should be located in any particular position in the chains. In Figures 1 and 2 the bushes are shown as being so positioned that the line 36 in each is inwardly directed. This is a convenient position because when the chain is under tension the studs 34 bear on undivided surfaces in the bushes while the chain wheel teeth also bear on undivided external surfaces. Evidently, however, a similar result would be attained if the lines 36 were directed in many different positions. The bending and coiling tools are generally shaped at their faces of course to correspond with the external shape of the bushes to be formed, but the tools can themselves mould the strip in the bending and coiling to a certain extent so that a cross-section of a strip need not correspond exactly with the cross-section of the finished bushes or rollers to be formed.

In a machine of the type set forth, the bending of a strip to form a U-piece on the bending mandrel is taking place simultaneously with the coiling of a U-piece to form a finished bush on the coiling mandrel. A machine operating on these lines can be made to run at a speed such as to produce completely coiled bushes from the strip at the rate of from 60 to 100 bushes per minute.

Having thus described our invention what we claim as new and desire to secure by Letters Patent is:—

1. A method of making bushes and rollers adapted for use in gear chains which consists in forming pieces in a strip of metal of appropriate section by bending parts substantially to the curve of a portion of the finished products, severing each piece from the strip and coiling said pieces with bent ends around a mandrel by pressure applied at either side of the middle of each such piece.

2. A method of making bushes and rollers adapted for use in gear chains, said method consisting in bending a strip of metal of appropriate section around a mandrel with rounded corners, severing the bent ends of the strip in the form of elongated U-shaped pieces with ready bent ends, and coiling the U-shaped pieces around a mandrel by pressure applied at either side of the middle portion of said U-shaped pieces, whereby their middle portions are coiled to the required shape.

3. A method of making bushes and rollers adapted for use in gear chains, which includes bending a strip of metal of appropriate cross-section around a mandrel to form a plurality of spaced part-cylindrical bends and severing bent portions from the rest of the strip in such positions as to leave them with their ends already curved to a form required.

4. A method of making bushes and rollers adapted for use in gear chains, which includes bending a strip of metal of appropriate cross-section around a mandrel to form a plurality of spaced bends and severing bent portions from the rest of the strip in such positions as to leave them with their ends already curved to a form required and with intermediate unbent portions.

5. A method of making bushes and rollers adapted for use in gear chains, which includes bending about a mandrel a portion of a metal strip of appropriate cross section, such bending being effected so as to form a plurality of bends spaced a short distance apart and severing a ready bent portion at the end of the strip by removing from the strip the length in the short space aforesaid, whereby at each severing operation the strip is left with a ready bent end and each piece severed from the strip has both of its ends ready bent with a short unbent portion between the ends, the one end being bent during the bending operation last preceding the severing and the other end being bent in an earlier bending operation preceding the next prior severing operation which left the strip with a ready bent end.

6. In the making of bushes and rollers adapted for use in gear chains, the steps which consist in delivering a strip of metal of appropriate cross section intermittently in lengths along one face of a bending mandrel having rounded corners, the end of such strip having been left bent to the required form by a previous bending operation, bending the projecting length of such strip about one rounded corner of said mandrel, bending the remainder of such projecting length around the next rounded corner of the said mandrel, then severing the portion of the strip with two bent ends from the remainder of the strip which is thus left with its end bent.

7. Apparatus for use in making bushes and rollers adapted for use in gear chains, such apparatus comprising a mandrel with a plurality of rounded corners, means for bending a metal strip around one rounded corner of said mandrel, means for bending said metal strip around the next rounded corner of said mandrel, means for severing a portion of such strip in a position such that it is left with bent ends, a coiling mandrel, and coiling tools with means for operating the same, said tools being adapted to complete the bending of the severed portions of said strip around said coiling mandrel.

8. Apparatus for use in making bushes and rollers adapted for use in gear chains, such apparatus consisting of a mandrel with two rounded corners and a recess between them, the rounding of such corners being effected to a curvature corresponding substantially with the internal curvature of the finished products, first and second bending tools with means for operating them successively for bending a projecting length of a strip of metal around the said rounded corners of the mandrel, and a blade adapted to enter the said recess in the mandrel and to sever a piece with bent ends from said strip.

9. Apparatus as claimed in claim 8 with means for securing the blade upon the second bending tool in such a position that the end of the blade enters the recess in the mandrel at the end of the forward movement of said second bending tool.

10. Apparatus as claimed in claim 8, the first bending tool whereof has its face rounded at the front, leading into a straight face adapted to bear upon the outer face of a metal strip and to press the same against a face of the bending mandrel, said straight face in turning leading into an inwardly curved face adapted to press the bend of a metal strip against the first rounded corner of the mandrel.

11. Apparatus for use in making bushes and rollers from strip metal of appropriate section, said apparatus comprising a bending mandrel with rounded corners, means for feeding a strip of metal intermittently along one face of said mandrel and for holding the strip against movement when not being fed positively, a plurality of bending tools and means for operating them in succession in such manner as to bend a portion of the strip metal around one rounded corner of said mandrel, and then a shorter portion of said strip around the next rounded corner of said mandrel, and means for severing a bent portion of the strip at a point between the first and second bends formed therein.

12. Apparatus for forming coiled bushes and rollers from strip metal, said apparatus comprising means for forming bends of substantially cylindrical curvature in a metal strip and for severing lengths of the strip with each end thereof already bent to such curvature, a coiling mandrel, means for feeding said strip lengths with ready bent ends to said mandrel, means for gripping said strip lengths at the middle part thereof against said mandrel, a pair of coiling jaws, and means for operating them towards and away from said mandrel in positions such that they can engage the ready bent ends of a strip length and coil them around the said mandrel while forming the intermediate portions of such strip lengths to the required curved shape.

13. Apparatus for forming coiled bushes and rollers from strip metal, said apparatus comprising a bending mandrel, means for bending lengths of the strip upon the same and means for severing lengths of the strip of an elongated U-shape with ready bent ends, transfer mechanism, a coiling mandrel to which the elongated U-shaped strip lengths are fed by said transfer mechanism, a gripper co-operating with said coiling mandrel and adapted to hold a strip length against said coiling mandrel, means for operating said gripper, coiling jaws adapted to embrace said coiling mandrel, and means for operating said jaws, the operating means for said gripper and jaws being adapted to remove the gripper just before said jaws come together, but after they have commenced to effect the coiling of a strip length about said coiling mandrel.

14. A method of making bushes and rollers of a shape which is of relatively large diameter at the middle and of reduced diameter to form necks at the ends, said method consisting in utilizing strip metal of a section with a ridge in the middle and with flanges of less thickness at the sides, bending a length of such strip metal on a bending mandrel, severing a length with its ends already bent, transferring such last mentioned length to a coiling mandrel, and coiling the same to the required form upon said coiling mandrel.

15. A method of making bushes and rollers of a shape which is of relatively large diameter at the middle and of reduced diameter to form necks at the ends, said method consisting in utilizing strip metal of a section with a ridge in the middle and with flanges of less thickness at the sides bending a length of such strip metal on a bending mandrel, severing a length with its ends already bent, transferring such last mentioned length to a coiling mandrel, coiling the same upon said last mentioned mandrel, and then drifting the coiled product through a die.

16. A method of making bushes and rollers of a shape which is of relatively large diameter at the middle and of reduced diameter to form necks at the ends, said method consisting in utilizing strip metal of a section with a ridge in the middle of arched form, and with flanges of less thickness at either side, and effecting the bending and coiling of such strip by means of appropriate tools, the arched form of said ridge providing the metal required to compensate for the greater drawing action on the centre line of the strip in the bending and coiling.

17. A method of making combined bushes and fixed rollers with necks at their ends adapted to enter apertures in chain links, and middle portions of larger size adapted to act as fixed rollers, such method consisting in utilizing strip metal of a centrally rigid section, bending such strip metal at a plurality of places to a curved form, severing lengths of the strip with such bends at the ends thereof, and subsequently completing the coiling of such strip lengths upon a mandrel.

18. In a machine for making coiled bushes and rollers from strip metal, the combination of a bending mandrel, bending tools and a severing blade with means for actuating the same, said bending mandrel having a recess therein into which said severing blade is adapted to enter while punching out a bit of metal from the strip, a pusher and means for operating the same, said pusher being adapted to push the severed bent lengths of the strip laterally along the bending mandrel, and a projection on said pusher engaging in said recess in the bending mandrel, and adapted to expel the punched bits of metal therefrom when pushing the severed bent lengths of the strip along said mandrel.

19. In apparatus for forming coiled bushes and rollers from strip metal, the combination of a bending mandrel, means for feeding strip metal transversely to said mandrel, means for bending portions of said strip metal around said mandrel, means for severing strip metal pieces with bent ends, a pusher and means for traversing the same along said mandrel, a coiling mandrel, a movable platform, means for drawing back and for advancing said platform away from and toward the end of said bending mandrel into a position to receive the metal pieces with bent ends delivered by said pusher, a gripper adapted to hold said metal pieces with bent ends upon said coiling mandrel, and jaws with means for operating the same, said jaws being adapted to co-operate with said coiling mandrel in coiling said metal pieces with bent ends upon said coiling mandrel.

20. Apparatus as claimed in claim 19, whereof the platform is formed with a stop face against which a strip metal piece with bent ends comes to lie when advanced by the pusher into position ready for engagement by the gripper and subsequently by the jaws.

21. Apparatus as claimed in claim 19, whereof the means for operating the movable platform and the coiling mandrel comprise a rearward extension of said platform and a rearward extension of said coiling mandrel slidable in said rearward extension of the platform, operating means positively connected to the rearward extension of said platform, a slider positively connected to the rearward extension of the coiling mandrel, a stop for said slider, and spring mechanism adapted to draw forward said slider toward said stop, said operating means and slider being so positioned that said platform can advance after said coiling mandrel is held stationary by said stop and slider, and can recede while said coiling mandrel is stationary, and can recede further carrying backwards with said platform the coiling mandrel.

22. Mechanism for coiling a strip of metal with bent ends, said mechanism comprising a coiling mandrel, a guide adapted to act as a stripper, means for drawing back said coiling mandrel and for advancing the same in relation to said guide, means for delivering a strip of metal with bent ends to said mandrel, a gripper and means for operating the same to grip said strip of metal upon said mandrel, a plurality of coiling jaws with faces adapted to press the ends of the strip around said mandrel, and means for operating said jaws, the operating means aforesaid being so adjusted and timed that the gripper aforesaid holds the strip until the jaws aforesaid have partially coiled the same, whereupon said gripper is withdrawn while said jaws close and open again, whereupon said mandrel is withdrawn past said guide acting as a stripper, whereupon said gripper makes a sharp movement adapted to insure the ejection of the coiled strip product.

ROBERT OSLER HERFORD.
ALFRED RENSHAW.